Feb. 25, 1958     M. L. BAXTER, JR., ET AL     2,824,498
GENERATOR FOR CYLINDRICAL AND TAPERED
GEARS AND METHOD OF GENERATION
Filed Jan. 19, 1955     8 Sheets-Sheet 1

INVENTORS
MERIWETHER L. BAXTER, JR.
LEONARD O. CARLSEN
BY
Richard W. Treverton
ATTORNEY

INVENTORS
MERIWETHER L. BAXTER, JR.
LEONARD O. CARLSEN

BY Richard W. Treverton
ATTORNEY

Feb. 25, 1958   M. L. BAXTER, JR., ET AL   2,824,498
GENERATOR FOR CYLINDRICAL AND TAPERED
GEARS AND METHOD OF GENERATION
Filed Jan. 19, 1955                                8 Sheets-Sheet 3

INVENTORS
MERIWETHER L. BAXTER, JR.
LEONARD O. CARLSEN
BY
Richard W. Treverton
ATTORNEY Feb. 25, 1958    M. L. BAXTER, JR., ET AL    2,824,498
GENERATOR FOR CYLINDRICAL AND TAPERED
GEARS AND METHOD OF GENERATION
Filed Jan. 19, 1955                                      8 Sheets-Sheet 6
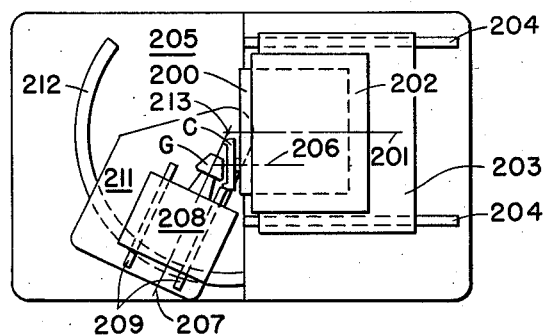
FIG. 11
FIG. 12
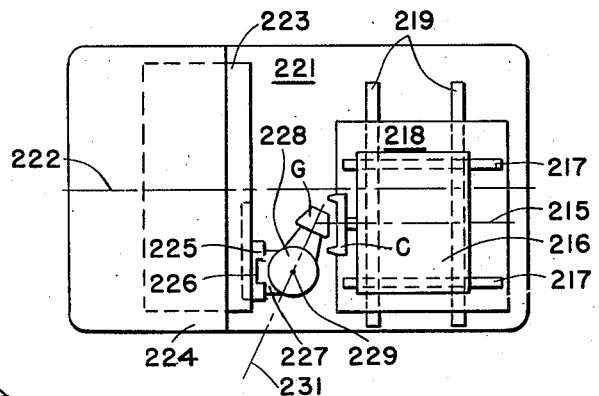
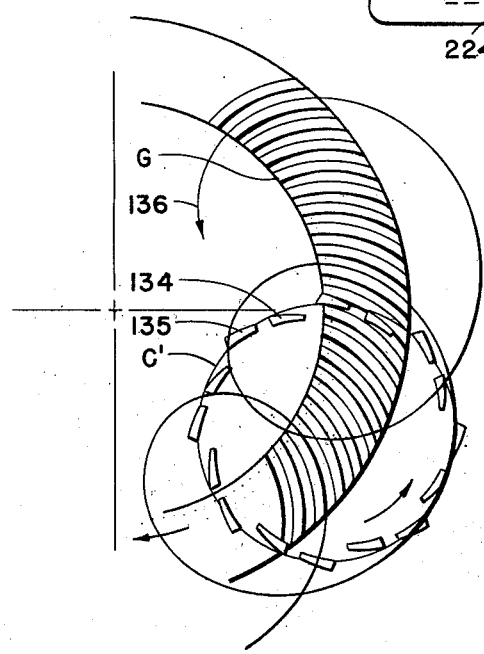
FIG. 10
INVENTORS
MERIWETHER L. BAXTER, JR.
LEONARD O. CARLSEN
BY *Richard W. Treverton*
                    ATTORNEY Feb. 25, 1958 M. L. BAXTER, JR., ET AL 2,824,498
GENERATOR FOR CYLINDRICAL AND TAPERED
GEARS AND METHOD OF GENERATION
Filed Jan. 19, 1955 8 Sheets-Sheet 7

INVENTOR.
MERIWETHER L. BAXTER, JR
LEONARD O. CARLSEN
BY *Richard W. Treverton*
ATTORNEY

*INVENTOR.*
MERIWETHER L. BAXTER, JR.
LEONARD O. CARLSEN
BY Richard W. Treverton
*ATTORNEY*

United States Patent Office 2,824,498
Patented Feb. 25, 1958

2,824,498

GENERATOR FOR CYLINDRICAL AND TAPERED GEARS AND METHOD OF GENERATION

Meriwether L. Baxter, Jr., Brighton, and Leonard O. Carlsen, Rochester, N. Y., assignors to The Gleason Works, Rochester, N. Y., a corporation of New York Application January 19, 1955, Serial No. 482,736

22 Claims. (Cl. 90—3)

The present invention relates to a machine for generating both cylindrical and tapered gears, and like toothed parts, and to a new method which may be practiced on the machine for producing long-cone-distance tapered gears. The invention is applicable to both cutting and grinding machines and hence it will be understood that the terms "cutting," "cutting tools" and the like, are used in this broad sense, to include grinding, grinding tools and the like.

In conventional bevel and hypoid gear generators there is a rotatable cradle which supports either the cutting tool or the work spindle, and a generating drive train which rotates the cradle in time with rotation of the spindle, so that the work gear on the spindle has a motion relative to the cutting path of the tool similar to that which it might have to a tooth of a mating gear. According to the present invention the machine further includes a slide for effecting a relative translatory motion between the tool and the work spindle, and a drive means for producing such motion in time with rotation of the work spindle. For generating bevel or hypoid gears of short cone distance the machine may be operated like a conventional bevel and hypoid generator, without any motion of the slide except during the adjustment or set-up of the machine. For generating cylindrical gears, i. e. spur or helical gears, the cradle is locked against rotation and the work spindle is rotated in time with translation of the slide, so that the motion of the work gear relative to the cutting tool is like the motion it would have relative to a tooth of a mating rack.

In the conventional method of generating bevel and hypoid gears the cradle axis is coincident with the axis of the generating gear represented by the tool; and, accordingly, the cone distance of a work gear is limited by the amount of adjustment of the cutting tool relative to the cradle axis. According to the method of the present invention tapered gears of any cone distance can be generated on a machine of any size. To cut a long-cone-distance gear both the aforementioned slide and the cradle are driven by the generating train in time with rotation of the work spindle. As a result, the cutting path of the tool, instead of rotating relative to the work gear axis about the cradle axis, moves in a path of a generally trochoidal nature which gives the effect of rotation of the cutting path of the tool about an axis that is as remote from the cradle axis as is desired, the degree of remoteness depending upon the relation between the arcuate travel resulting from the cradle rotation and the translation resulting from the motion of the slide.

It has been found that for the limited arc of motion required for gear tooth generation the difference in tooth profile shape resulting from the trochoidal motion of the present invention, as compared with that resulting from the conventional circular arc motion, is so small as to have no practical significance, especially since such difference as does exist is largely compensated for by generating the mating gear or pinion by the same method. Moreover, just as in the case of conventional generation, the tooth profile shape may be modified as desired by various methods known in the art, such for example as by slightly varying the ratio of work spindle rotation to cradle rotation as the generation proceeds. Furthermore by suitably varying the ratios of the rotations of the cradle and work to slide translation, tooth surfaces can be produced which are of exactly the same shape as obtained in conventional generation.

The foregoing and other objects and advantages of the invention will appear from the following description made with reference to the drawings, wherein:

Fig. 10 is a diagram showing the path of cutting blades of the face hob of Fig. 9 relative to a work gear;

Figs. 11 and 12 are schematic plan views, on a scale smaller than Fig. 2, showing two different modifications in the arrangement of major components of the machine;

Figure 1:
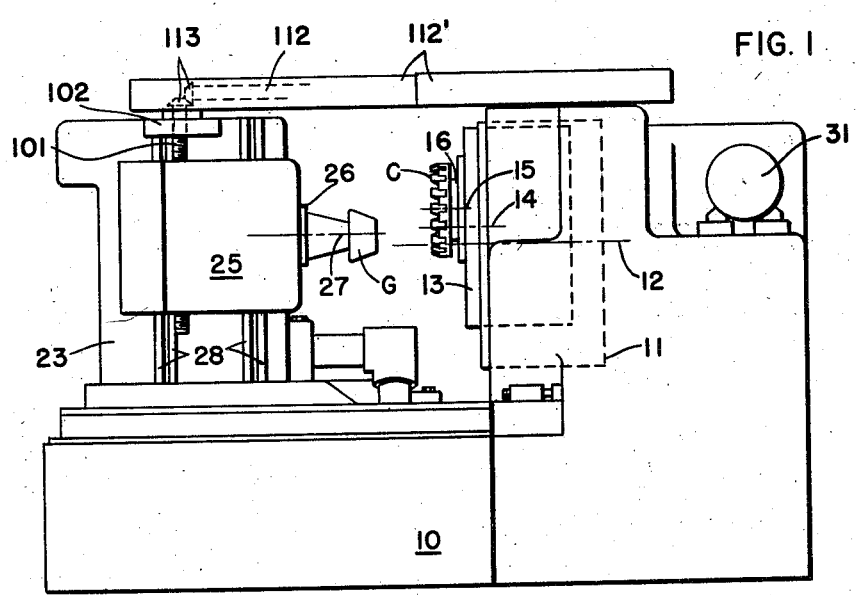
Fig. 1 is a side elevation of the machine with its work head so positioned that the work and cradle axes are parallel.
Figure 2:
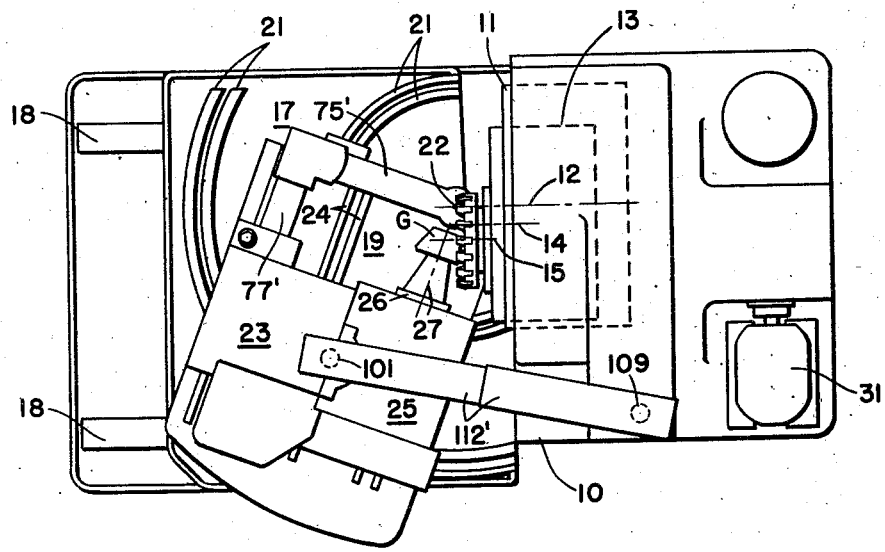
Fig. 2 is a plan view of the machine with work head positioned for cutting a tapered gear.

The invention is applicable to machines of various types and in Figs. 1 and 2 is shown as applied to a machine of the general kind disclosed in L. O. Carlsen Patent 2,302,004, granted November 17, 1942. Reference may be made to that patent for certain details of the machine that are not a part of the present invention and hence are not illustrated herein. The machine comprises a frame, here designated 10, on which a cradle 11 is mounted for rotation about a horizontal axis 12. A drum 13 is adjustable on the cradle about an axis 14 which is parallel to cradle axis 12. Journaled for rotation in the drum about axis 15 is a cutter spindle 16 on which is mounted a face mill cutter C. In this machine the axis 15 is parallel to axes 12 and 14 and by adjusting the drum on the cradle about axis 14, the distance between axes 12 and 15 may be varied as desired. This adjustment, known as the cutter radial adjustment, is limited by the eccentricity of axes 12, 14 and 15 which in turn must be limited by the diameter of the cradle. If desired the machine may include means for tilting the cutter axis with respect to the cradle axis, this being a feature now well known in bevel and hypoid machines.

A sliding base 17 is adjustable, and also movable during operation of the machine, along ways 18 on the frame 10 which are parallel to the cradle axis. On this sliding base a swinging base 19 is angularly adjustable, along arcuate ways 21, about a vertical axis 22 which intersects the cradle axis 12 at a right angle. A column 23 is adjustable rectilinearly on the swinging base along ways 24, in a direction perpendicular to axis 22. On the column is a work head 25 in which there is journaled for rotation a work spindle 26 whose axis 27 is perpendicular to and intersects axis 22, and is parallel to ways 24. The work head is movable vertically on the column along ways 28 so that the work axis 27 may be moved vertically with respect to cradle axis 12. By the aforementioned adjustments a work gear G on the spindle 26 may be properly positioned, as shown in Fig. 2, to have its tooth surfaces cut by the cutter C.

Figure 3:
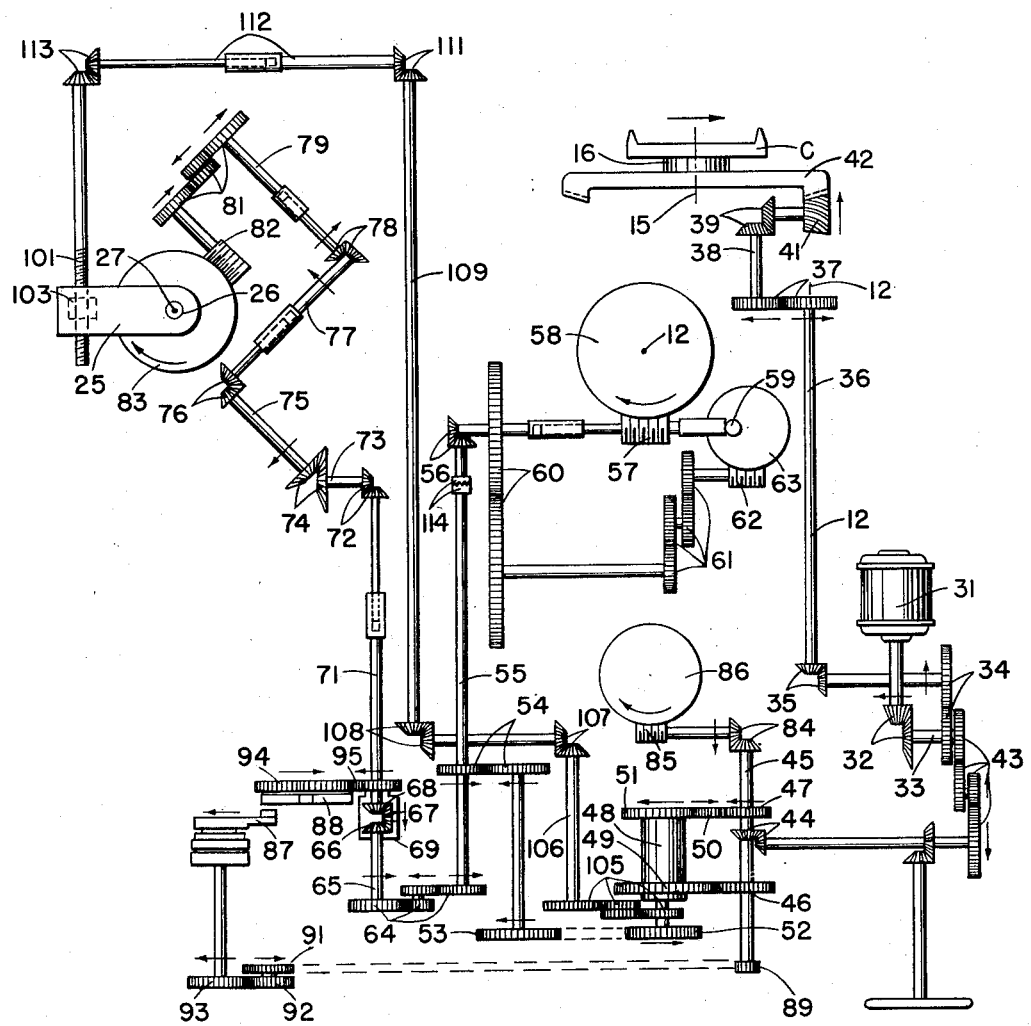
Fig. 3 is a drive diagram of the machine when arranged to operate by an intermittent indexing method.

The drive mechanism of the machine, as shown diagrammatically in Fig. 3, comprises a motor 31 which drives the cutter C through a drive train comprising bevel gear 32, shaft 33, cutter speed change gears 34, bevel gears 35, shaft 36, gears 37, shaft 38, bevel gears 39, bevel pinion 41, and bevel gear 42 on cutter spindle 16. Shaft 36 is rotatable on cradle axis 12 and shaft 38 is rotatable on drum axis 14, this arrangement permitting the above-described radial adjustment of the cutter.

The generating motions of the machine are effected by a drive from shaft 33 through generating cycle speed change gears 43, and bevel gears 44, to a shaft 45 on which are gears 46 and 47 for driving a reversing drum 48 alternately in opposite directions. Gear 46 meshes directly with a gear 49 coaxial of the drum while gear 47 drives another gear 51 coaxial of the drum through an idler gear 50. In the drum is a mechanism which acts in response to turning of the drum through a predetermined number of turns to alternately clutch and declutch the drum to and from the gears 49 and 51. When gear 51 is clutched the drum is driven in the same direction as shaft 45 and when gear 49 is clutched the drum is driven in the opposite direction. The reversing mechanism may be of any suitable construction, such for example as that described in L. O. Carlsen Patent No. 2,000,215 of May 7, 1935. Rotatable with the drum is a gear 52 which meshes with a gear 53 and through it and gears 54 drives a shaft 55 which is disposed horizontally in the machine frame, parallel to the cradle axis 12. Through bevel gears 56 the shaft 55 drives a worm 57 which meshes with a worm wheel 58 affixed to the cradle 11, for rotating the latter about its axis 12.

The rate of rotation of the cradle may be modified by oscillating the worm 57 axially, by a mechanism described in detail in aforementioned Patent No. 2,302,004. This mechanism comprises an eccentric 59 for oscillating the worm axially, and a drive train from the worm shaft to the eccentric comprising gears 60, roll-modification change gears 61, worm 62 and worm wheel 63 with which the eccentric rotates as a unit. The eccentricity of the eccentric relative to worm wheel 63 may be adjusted by suitable means (not shown).

The work spindle 26 is rotated in constant velocity ratio with the cradle drive worm 57, being driven from the shaft 55 through a drive train comprising ratio-of-roll change gears 64 (which determine the ratio between cradle rotation and work spindle rotation), shaft 65, gears 66, 67 and 68 of a differential unit whose case is designated 69, horizontal telescoping shaft 71, bevel gears 72, vertical shaft 73, bevel gears 74, inclined shaft 75, bevel gears 76, horizontal telescoping shaft 77, bevel gears 78, vertical telescoping shaft 79, index change gears 81, and worm 82 meshing with worm wheel 83 on work spindle 26. Horizontal telescoping shaft 71 is parallel to ways 18 and hence permits motion of sliding base 17 along the ways while vertical shaft 73 is on axis 22 and permits adjustment of the swinging base 19. Inclined shaft 75 is in tubular housing part 75′ of the swinging base. Horizontal telescoping shaft 77, within tubular housing part 77′ of the swinging base, extends in the direction of ways 24 and hence permits adjustment of column 23 in the direction of the work axis 27, while vertical telescoping shaft 79, disposed within the column 23 and work head 25, enables vertical movement of the work head 25 on the column.

The housing 69 of the differential unit is stationary during the gear-generating rotations of cradle 11 and work spindle 26 but during their return rotations is rotated to advance the work spindle by one or more circular pitches of the work gear, to thereby bring a successive tooth space of the latter into cutting position. Preceding such indexing the sliding base 17 is withdrawn along ways 18 to move the work gear clear of the cutter. Such withdrawal is effected by a cam, not shown, which is driven from unidirectionally rotating shaft 45 by means of bevel gears 84, worm 85 and worm wheel 86 which rotates as a unit with the cam. The intermittent rotation of differential housing 69 is effected through a Geneva movement comprising a rotary drive member 87 having a roller which intermittently engages a slotted rotary driven member 88. The drive member is driven from unidirectionally rotating shaft 45 through gears 89, 91, 92 and 93. A gear 94 on the driven member 88 meshes with a gear 95 secured to the differential case 69. The arrangement is such that once during each cycle of the reversing mechanism in drum 48 (which is also once for each revolution of the cam driven by worm wheel 86), the Geneva movement 87, 88 operates to advance the work gear by one or more integral circular pitches. The angle of each such advance is of course determined by the ratio of the index change gears 81.

The above described drive mechanism is substantially like that shown in aforementioned Patent No. 2,302,004. According to the present invention additional drive means are provided to move the work head 25 on the column 23 in time with rotation of the work spindle. For this purpose vertical screw 101 is journaled for rotation on an anti-friction bearing supported by part 102 of the column, and is threaded to a nut 103 that is secured to the work head 25. Preferably the nut is of the circulating ball-bearing type, in which an endless train of balls is arranged in the helical groove in the nut and in a return passage connecting the ends of the groove, the balls having rolling contact with the walls of the groove and with the thread of screw 101. The screw is driven from reversing drum 48 by a gear train including ratio change gears 105, shaft 106, bevel gear pairs 107 and 108, vertical shaft 109, bevel gears 111, overhead horizontal telescoping shaft 112 within telescoping housing 112′, and bevel gears 113.

For generating bevel and hypoid gears by conventional methods, one or more of the change gears 105 is removed and by a wrench applied to a socket in the end of screw 101 the latter is turned to adjust head 25 vertically along ways 28 on the column to thereby position work axis 27 in the same horizontal plane with cradle axis 12 or at the desired amount of hypoid offset therefrom, and the screw 101 is then clamped against rotation to the column 23 by suitable means (not shown). After the other necessary adjustments the machine may then be operated in the usual manner, with gear tooth generation by the rotating cutter resulting from the cradle rotating about its axis 12 in time with rotation of the work about axis 27. After the roll has proceeded far enough to end the contact of the cutter with the work the cam driven by worm wheel 86 withdraws the sliding base 17, and the mechanism 87, 88 indexes the work by one circular pitch. Simultaneously the drum 48 reverses to return the cradle 11 to its original position. The drum then again reverses, the cam advances the sliding base, and the generating cycle is repeated. This operation continues until all the teeth of the work gear have been cut.

Figure 4:
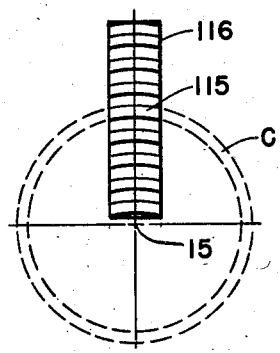
Figs. 4 and 5 are schematic views showing how the relative positioning of the cutter and work determines the tooth shape of cylindrical gears produced on the machine.
Figure 5:
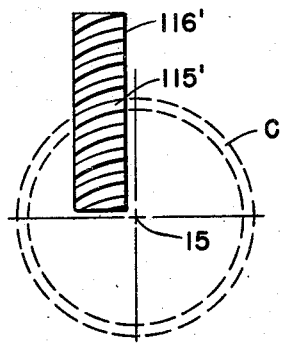

For generating cylindrical gears, change gears 105 of the proper ratio are installed and the screw 101 is unclamped; the machine is adjusted to bring the work gear axis 27 to right angles to the axes 12, 14 and 15 and to bring the cutter C into such position that it represents a tooth of a generating rack; the cradle is locked against movement relative to the frame 10 by suitable means (not shown); and clutch 114 is disengaged to thereby disconnect the two ends of shaft 55, thereby disrupting the drive to the cradle drive gears 57, 58. During each generating cycle of the machine, which is generally the same as to sequence of operations as described above for bevel gears, the work will be moved vertically by screw 101 in time with work rotation about axis 27, while the axis of the rotating cutter remains stationary. The action is as though the work gear were rolling along a rack, one tooth of which is represented by the cutter. In the event the cutter axis is disposed symmetrically with respect to the work gear the cutter C will, as shown in Fig. 4, represent one tooth 115 of a generating rack 116 whose teeth have a mean direction parallel to the work gear axis. Or, if the cutter axis is adjusted into asymmetrical relation to the work gear, then as shown in Fig. 5 the cutter represents one tooth 115' of a generating rack 116' whose teeth have a mean direction inclined to the work gear axis. Thus cylindrical gears of either the spur or helical type can be produced. With the particular cutting tool illustrated the gear teeth will be curved from end to end. However, if desired, there may be substituted for this tool either one or a pair of reciprocating tools, or disc cutters. With such substitution the gear teeth that are produced will be conjugate to those of a straight toothed rack. That is they will be conventional spur or helical gears.

In generating long-cone-distance bevel and hypoid gears, after the necessary adjustments have been made, including the installation of change gears of the proper ratio and engagement of clutch 114, the machine is operated with the work spindle and cradle both rotating in time with the vertical motion of head 25 effected by screw 101.

Figure 6:
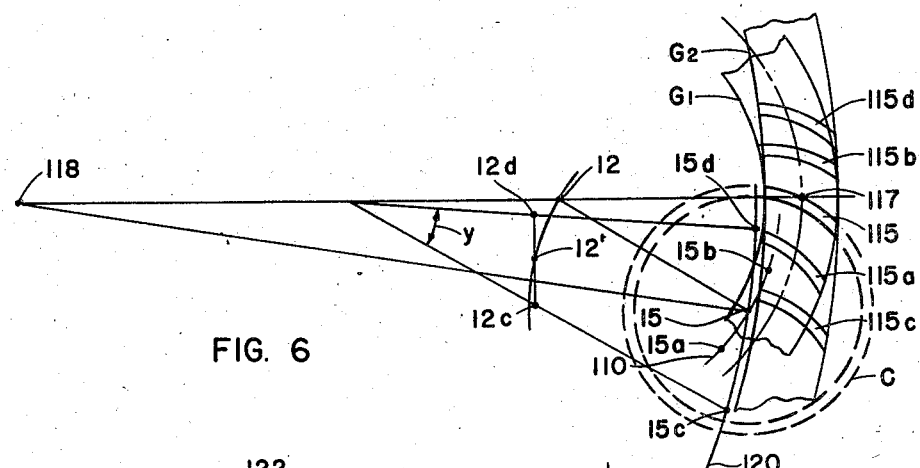
Fig. 6 is a diagram in the pitch plane illustrating the effect of the translatory or slide motion on the diameter of the generating gear which the tool represents when generating a tapered gear.

The effect of generation employing such vertical motion, in comparison with conventional tapered gear generation, is shown in Fig. 6. In the conventional case the rotating cutter C in moving with the cradle about axis 12 represents one tooth 115 of a rotating generating gear $G_1$ whose axis is at 12. In the position shown the mean point 117 on the convex side of this tooth lies in the same horizontal plane with axis 12, and, when generating a bevel gear, the axis of the gear being generated may also lie in this plane. In other positions of the cradle wherein the cutter axis is at 15a and 15b the tooth 115 will be at 115a and 115b, respectively. During tooth generation the cradle may rotate counter-clockwise carrying the cutter axis along circular path 110 from position 15a through position 15 to position 15b.

With the method of the present invention the cradle axis may be relatively positioned to lie at 12', substantially below horizontal plane 12—117, when the cutter axis is at 15, with the mean point of tooth 15 at point 117. The vertical motion effected by screw 101 has the effect of moving the cradle axis relative to the work gear from 12c to 12d while the cradle rotates about its axis through angle y (actually the screw 101 moves the work gear vertically, the cradle axis remaining stationary). Accordingly when the cradle axis is at 12c the cutter axis is at 15c and the generating gear tooth which the cutter represents is at 115c; and when the cradle axis is at 12d the cutter axis is at 15d and the tooth at 115d. The curved path 120 which contains points 15c, 15 and 15d is a trochoid whose mean center of curvature for the arc under consideration is point 118. Thus although the cutter radial distance 12'—15 is the same as the distance 12—15, the cutter now represents a generating gear $G_2$ whose axis is at 118 and whose mean radius or cone distance is 117—118. By varying the relationship between the angle y and the vertical motion 12c—12d the cone distance 117—118 can be varied as desired from a distance equal to 117—12 to infinity. Since the machine adjustments enable the machine radial setting 117—12 to be reduced to zero the cone distance 117—118 may be made of any desired length.

Figure 7:
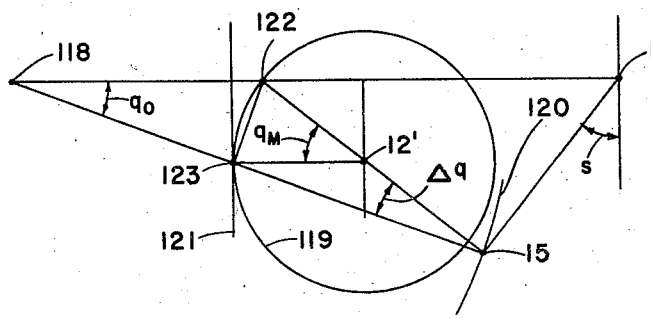
Fig. 7 is a further diagram in the pitch plane showing the geometrical relationships involved in generating long-cone-distance tapered gears by the present method.

With reference to Fig. 7, it will be seen that a rotation of point 15 about point 12' while the latter is moving vertically in constant velocity ratio to the rotation, might be produced by affixing point 15 to a circle 119 whose center is 12' and then rolling the circle on a vertical line 121. To further explain the geometrical relations involved, the point of intersection of line 15–12' with line 117—118 has been designated 122, and from this point a perpendicular has been dropped to line 15—118, intersecting the latter at point 123. Radial line 12'—123 is perpendicular to vertical line 121 and hence is parallel to line 117—118. Giving the following designations to the several angles and distances the Formulas 1 to 10 below are readily derived. Let $q_0$=angle 117—118—15
$r$=the cutter radius, 15—117
$s$=the tooth spiral angle of generating gear $G_2$
$A$=cone distance 117—118
$S_0$=distance 15—118
$E_m$=the vertical distance from point 12' to line 117—118, the machine hypoid offset at the mean point of generation.
$\Delta S$=distance 118—123
$\Delta q$=angle 12'—15—123
$q_M$=the angle 122—12'—123
$S_M$=the machine radial setting, distance 12'—15
$\frac{L}{2\pi}$=the vertical generating motion in linear units per radian of cradle rotation (also the radius of disc 119)
$R_a$=the ratio of roll of the work about axis 27 to that of the cradle about axis 12'.
$R_{ao}$=the ratio of the tooth number of the generating gear $G_2$ to the tooth number of the work gear.

It will be seen that:

(1) $$\text{Tan } q_0 = \frac{r \cos s}{A - r \sin s}$$

(2) $$S_0 = \frac{A - r \sin s}{\cos q_0}$$

(3) $E_M$ may be assumed (4) $$\Delta S = E_M \div \sin q_0$$

(5) $$\text{Tan } \Delta q = \frac{E_M}{(S_0 - \Delta S) \cos q_0}$$

(6) $$q_m = q_0 + \Delta q$$

(7) $$S_M = (S_0 - \Delta S) \frac{\sin q_0}{\sin q_M}$$

(8) $$\frac{L}{2\pi} = (S_0 - \Delta S) \frac{\sin \Delta q}{\sin q_M}$$

(9) $$A_x = A - \frac{L}{2\pi} - E_M \text{ ctn } q_0$$

(10) $$R_a = R_{ao} \cdot \frac{S_0 - \Delta S}{S_0}$$

The geometric relationship described above will cause the cutter center 15 to move in a path 120 closely approximating a circle about point 118 which is the center of the generating crown gear. This approximation is very close for practical cases. However the velocity of point 15 along path 120 is not exactly constant relative to the three machine motions, viz. cradle rotation, work rotation and vertical slide motion, and this results in what is, in effect, modified roll. This produces some bias and profile curvature changes in the generated teeth, but where the two members of the gear pair are generated by the same method these changes are in such directions as to compensate; there remain only small residual effects which are negligible for ordinary cases. In other cases correction may be made by modifying the cradle roll, by the action of eccentric 59, according to the modified roll method described in Patents No. 2,302,004 and No. 2,310,484.

Theoretically exact generation can be obtained by controlling the cradle and work rotations about their respective axes in relation to the rectilinear or vertical slide motion, such that the following relations hold at all times:

(11) $\quad S_M \cos q_M = S_0 \cos q_0 - (A - A_x)$
(12) $\quad E_M = S_0 \sin q_0 - S_M \sin q_M$ This can be accomplished, in a machine of the kind shown in Fig. 3, by providing a device to shift the worm 82 axially which is like the device 60, 61, 62, 63 59 heretofore described for shifting the worm 57 axially, and by making the parts 59 of both of these devices as cams which, while causing the work and cradle rotations to be in constant velocity ratio to each other, will vary the ratio of cradle rotation to the vertical motion in such manner as to maintain the above relationship (11) and (12) throughout the generation.

Figure 8:
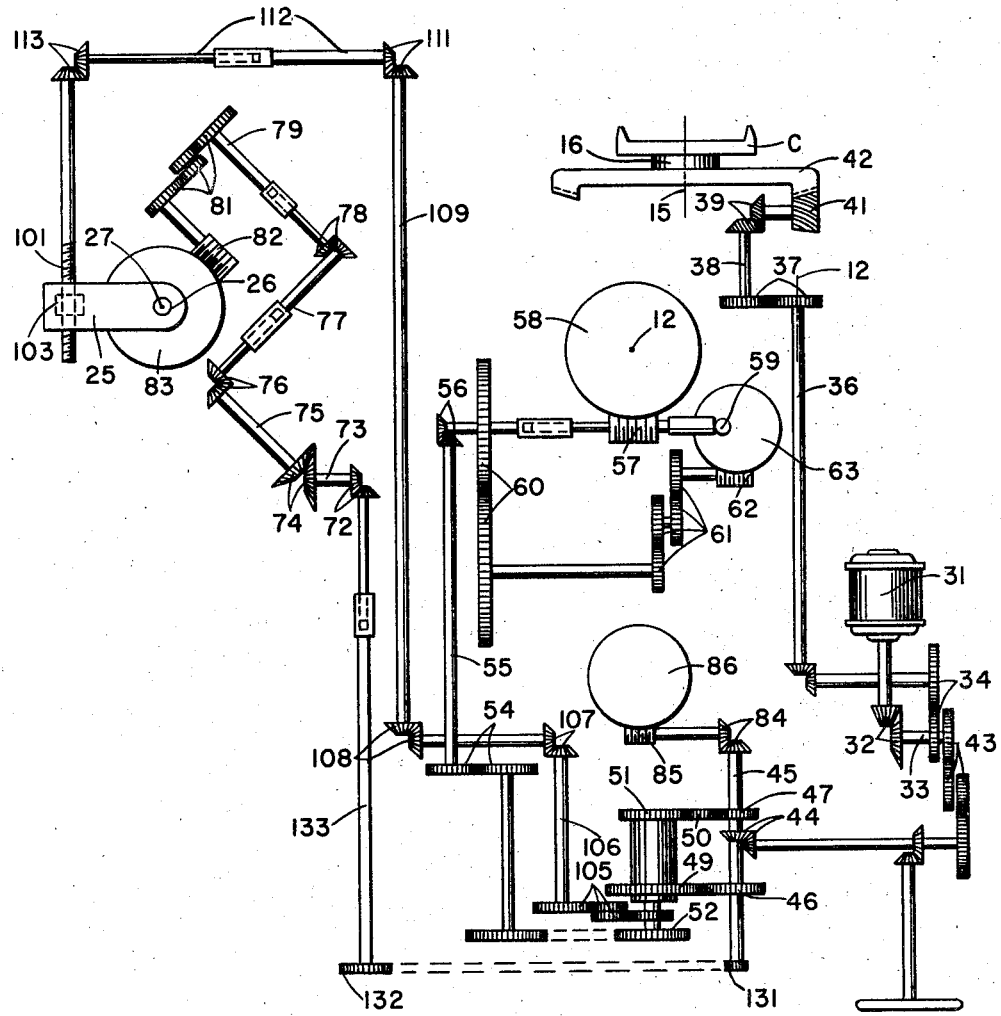
Fig. 8 is a view similar to Fig. 3, but showing a modified drive diagram for a machine operating by a continuous indexing method.

While the means for effecting the vertical generating motion and the method of generation has been described specifically with reference to a machine of one particular configuration it will be understood that they are equally applicable to numerous others. For example in Fig. 8 is shown the drive diagram of a machine differing from that of Fig. 3 in that during the generation the work rotates continuously in one direction, as in Patent No. 2,252,743, granted August 19, 1941, and only the cradle motion (and/or the vertical motion of the present invention) reverses periodically. This enables elimination of the intermittent index mechanism 87, 88 and the differential 66—69 in the drive for the work spindle 26. Instead the drive from unidirectionally rotating shaft 45 to bevel gears 72 and vertical shaft 73 may be through a gear 131 on shaft 45 and a meshing gear 132 on one end of a telescoping shaft 133 on whose opposite end the drive gear 72 is mounted.

Figure 9:
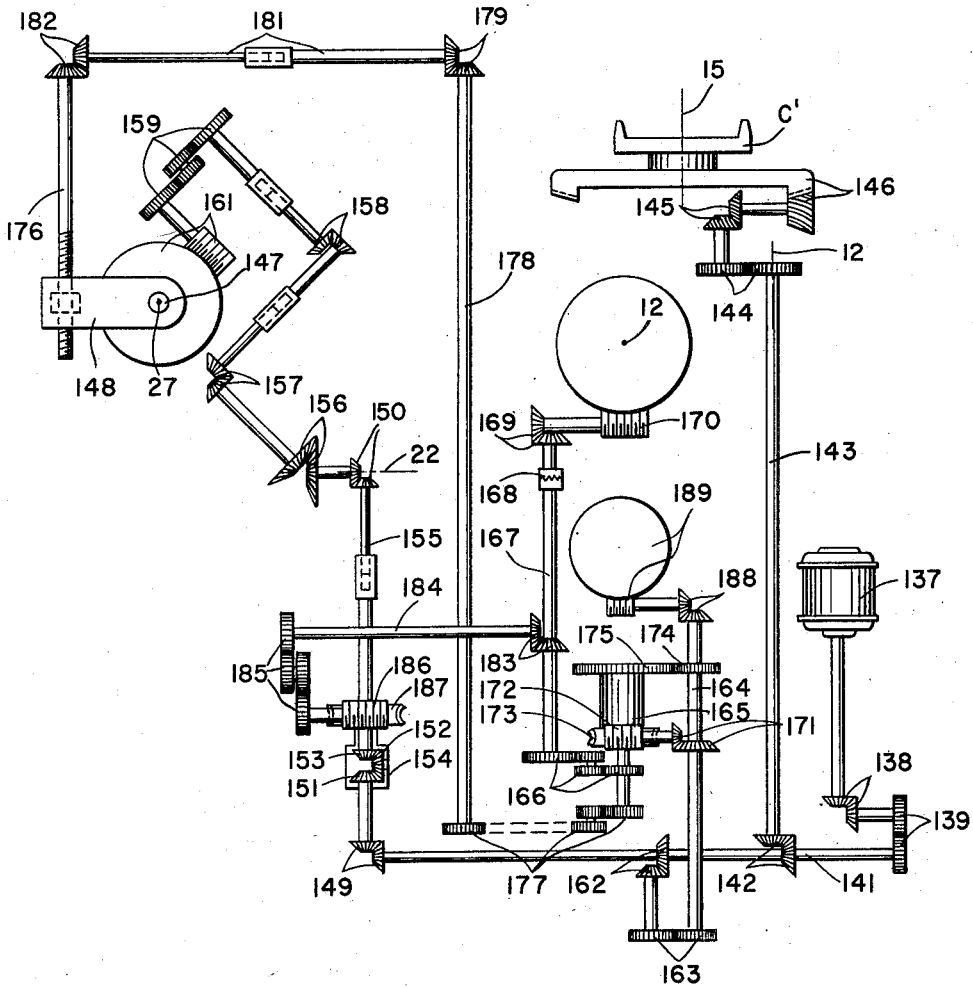
Fig. 9 is also a view similar to Fig. 3, but showing a further modified drive diagram for a machine employing a face hob instead of a face mill cutter.

In Fig. 9 is shown a further modified drive diagram for a machine of the same general arrangement as that shown in Figs. 1 and 2 but employing a face hob C′ instead of the face mill cutter C. In this machine the cutter and work rotate continuously, successive sets or groups of cutter blades passing successively through successive tooth spaces of the work, and there being only one generating roll of the cradle and of the vertical motion slide to generate all the teeth of the work gear. As shown in Fig. 10 each set of blades on the hob may comprise an inside cutting blade 134 and an outside cutting blade 135, and the cycloidal path of one set of blades relative to a gear being cut as indicated by the arrow 136. The face hobbing cutter C′ is driven from a motor 137 through bevel gear 138, cutter speed change gears 139, shaft 141, bevel gears 142, shaft 143 on the cradle axis 12, spur gears 144, bevel gears 145 and final reduction gears 146 of which the driven gear is secured to the cutter spindle whose axis is 15.

The work spindle 147 mounted in a work head 148 is rotatable about axis 27 in geared relation to cutter rotation through a drive train comprising shaft 141 which is connected to the cutter as described above, bevel gears 149, differential gears 151, 152 and 153 of which the planet gear 152 is carried by a rotatable differential case 154, telescoping shaft 155, bevel gear pairs 150, 156, 157 and 158, cutter-to-work ratio change gears 159 and final reduction gears 161. The cradle may be driven from shaft 141 through bevel gears 162, rate of roll change gears 163, shaft 164, reversing means including a drum 165 driven by gears from shaft 164, ratio of roll change gears 166, shaft 167, clutch 168, bevel gears 169 and final reduction gears 170. The drive for reversing drum 165 from shaft 164 may comprise bevel gears 171, worm 172 and worm wheel 173 for effecting a relatively slow drive during the generating roll of the cradle (and/or vertical motion slide), and gears 174 and 175 for effecting a faster return roll, it being understood that the gears 173 and 175 are alternately clutched to the drum and declutched therefrom automatically after a predetermined number of revolutions of the drum in each direction.

The vertical motion of work head 148 may be effected by screw 176 which is driven from the reversing drum 165 through ratio change gears 177, vertical shaft 178, bevel gears 179, overhead telescoping shaft 181, and bevel gears 182. For imparting a further rotation to the work spindle in time with the cradle motion and/or vertical motion produced by screw 176, the differential housing 154 is driven from shaft 167 through bevel gears 183, shaft 184, cradle-to-work ratio change gears 185, worm 186, and worm wheel 187 on the case 154.

As in the first-described embodiment, Fig. 3, in generating cylindrical gears the clutch, in this case clutch 168, is disengaged and the cradle is held against rotation; while in generating tapered gears in the conventional manner the change gears 177 are removed and the screw 176 is locked against rotation. For generating long-cone-distance tapered gears the screw 176 and the cradle both operate. Also as in the first-described embodiment the sliding base 17 of the machine may be operated by a cam rotating in time with the generating cycle. In this instance this cam may be driven from shaft 164 through bevel gears 188 and worm gearing 189.

The invention is also applicable to various different arrangements of the major components of the machine, i. e. the cutter spindle, work spindle, cradle and vertical slide. For instance, as shown in Fig. 11, the cradle 200 is rotatable about a horizontal axis 201 in a housing 202 which constitutes the vertical motion slide. For this purpose the housing 202 is arranged to slide vertically in a column 203 which in turn is movable for adjustment and for feed motion in a horizontal direction along ways 204 on frame 205 to bring the cutter C into or out of engagement with the work gear G, the cutter being journaled in the cradle for rotation about axis 206. The work gear is mounted on a work spindle journaled for rotation on horizontal axis 207 in a work head 208 which is adjustable horizontally along ways 209 on a swinging base 211 which in turn is adjustable along arcuate way 212 on frame 205 about a vertical axis 213 which intersects the cradle axis 201.

As another example, in Fig. 12 is shown a machine in which all of the generating motions are on the work gear G, the cutter merely rotating about its own axis, or, if desired also having a feed motion along its axis. In this case the cutter spindle is journaled for rotation about its axis 215 in a housing 216 which is adjustable, and also is adapted for feed motion, along ways 217 of sliding base 218. The latter is adjustable along transverse ways 219 on the frame 221 to vary the distance between the cutter axis and cradle axis 222. The cradle, 223, is journaled for adjustment and rotation about axis 222 on a stationary column 224 on the frame. Adjustable radially on the cradle is a block 225 having a way 226 along which a slide 227 is adjustable in a direction perpendicular to the radial adjustment of the block. The slide 227 is also movable along way 226 during the generation of cylindrical gears or long-cone-distance tapered gears. On slide 227 is a housing 228 for the work spindle, this housing being adjustable on the slide about an axis 229 which is parallel to way 226. The work spindle is journaled in housing 228 for rotation about axis 231 which intersects axis 229 at right angles. It will be understood that axis 229 will move with the cradle about axis 222 in this embodiment of the invention; and that the rectilinear generating motion corresponding to the motion produced by screw 101 in Figs. 1–3 takes place along the axis 229.

Figure 13:
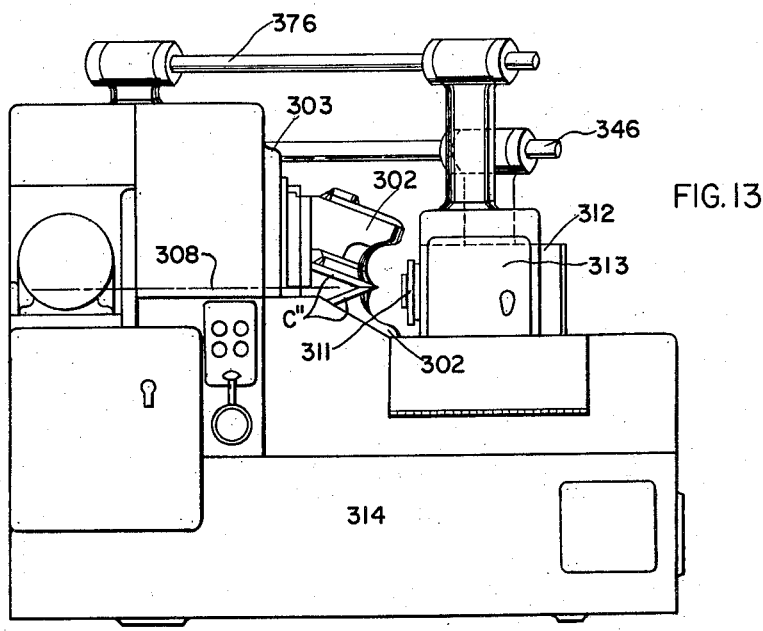
Fig. 13 is a side elevation of another modified form of machine, this machine having interlocking disc cutters which enable it to cut longitudinally straight toothed gears of the spur, helical, and straight and skew bevel types.
Figure 14:
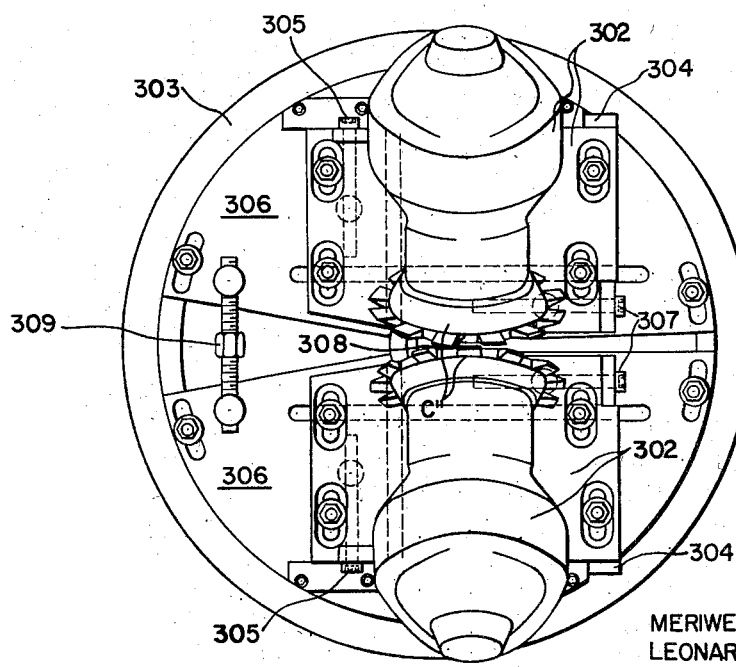
Fig. 14 is a detail view, in a vertical plane perpendicular to that of Fig. 13, showing the adjustable means for mounting the interlocking disc cutters on the cradle.
Figure 15:
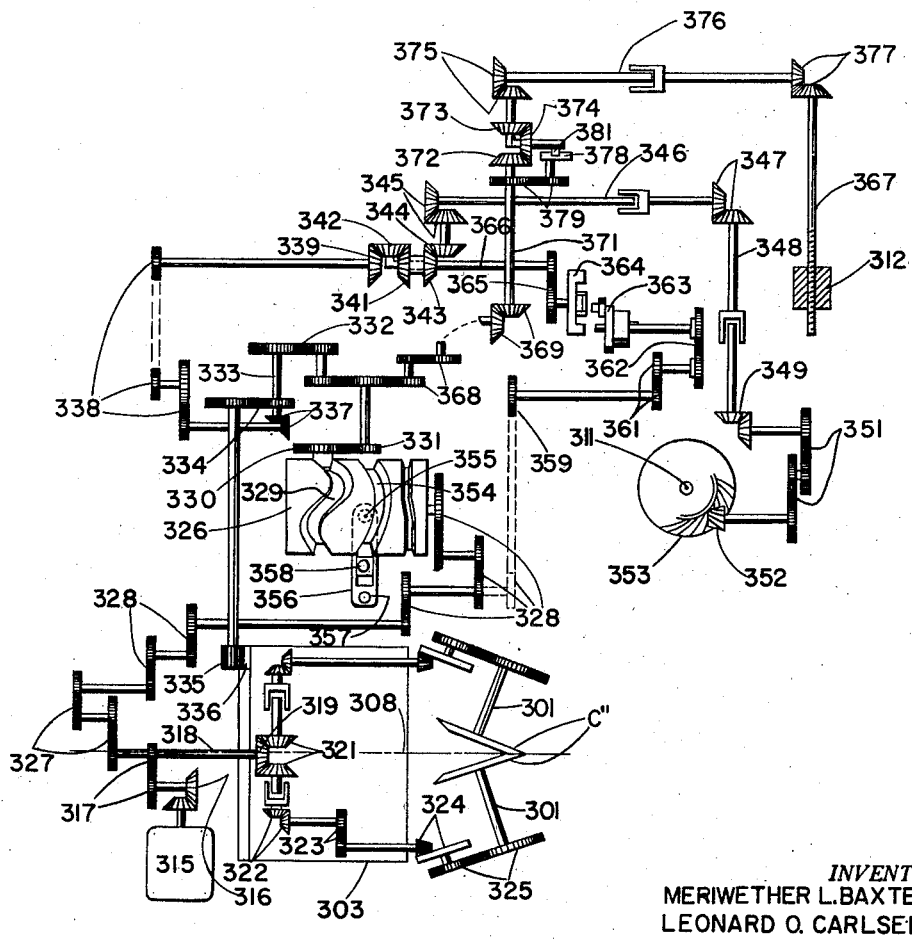
Fig. 15 is a drive diagram of the machine shown in Figs. 13 and 14.

Still another example of a machine embodying the invention is shown in Figs. 13, 14 and 15. This machine is of the general type shown in patent application Serial No. 372,623, filed August 5, 1953, by L. O. Carlsen, W. C. Critchley and C. E. Magee, having a pair of interlocking rotary disc cutters C'' which are mounted on relatively inclined spindles 301 in cutter spindle heads 302, the latter being so adjustable upon rotatable cradle 303 that the planes or flat cones described by the side-cutting edges of the two cutters represent the opposite sides of one tooth of straight-toothed generating gear or rack.

The cutter spindle heads may be adjusted vertically on slides 304, Fig. 14, by means of adjusting screws 305, and the slides in turn may be adjusted horizontally on semi-circular plates 306 by means of adjusting screws 307. The plates in turn may be adjusted on the cradle, angularly about the cradle axis 308, by means of turnbuckle 309. By these adjustments the cutter can be positioned to represent either a spur or helical generating rack, or a straight or skew bevel generating crown gear. After the adjustments are made the parts 302, 304 and 306 are clamped rigidly to the cradle by the clamp bolts shown.

The work spindle 311 of the machine is journaled for rotation in a work head 312 which is adjustable, and also movable during machine operation, vertically on work column 313; and the latter is adjustable on a sliding base (generally like base 17 in Fig. 2) about a vertical axis and also horizontally. By these adjustments either a cylindrical or tapered gear on the work spindle may be brought into the desired relation to the cutters. The sliding base is movable on the machine frame 314 in the direction of cradle axis 308.

As shown in Fig. 15 the drive for the cutters may be from motor 315 through bevel gears 316, cutter speed change gears 317, shaft 318 which is rotatable on cradle axis 308, and gears 319, and 321 to 325. The generating motions are effected by a cam 326 which makes one revolution for the generation of each tooth space, the cam being driven from shaft 318 through rate-of-generation change gears 327 and gearing 328. The track 329 of rotating cam 326 oscillates a gear segment 330 to drive a meshing pinion 331 alternately in opposite directions, and this motion is transmitted to cradle 303 through angle-of-roll change gears 332, shaft 333, gears 334, hypoid pinion 335 and mating hypoid gear 336 on the cradle. The work spindle 311 is driven from oscillating shaft 333 through bevel gears 337, cradle-to-work ratio-or-roll change gears 338, index differential gearing including side gears 339 and 341 and planet gear 342, gear 343 which rotates as a unit with gear 341, mating bevel gear 344, bevel gear pair 345, overhead telescoping shaft 346, bevel gear pair 347, vertical telescoping shaft 348, and (located in work head 312) bevel gear pair 349, index change gears 351, hypoid pinion 352 and mating hypoid gear 353 on the work spindle.

Once during each generating cycle (each rotation of cam 326) the sliding base of the machine is withdrawn to move the work clear of the cutters, this being accomplished by track 354 of the cam which acts on a cam follower roller 355 to swing a lever 356 which is fulcrumed to the machine frame at 357 and is connected to the sliding base by an adjustable pivot block 358. While the sliding base is withdrawn the work is indexed by a rotation of differential planet gear 342 (about the axis of side gears 339 and 341) by an index mechanism which includes a gear 359 driven by one of gears 328, gear pairs 361 and 362, drive member 363 of a Geneva movement, driven member 364 of the Geneva movement, gears 365 and shaft 366 which carries the pinion 342. Except during the indexing action shaft 366 is locked against motion by suitable means (not shown). The Geneva movement and the locking means may be of the kind described in detail in aforementioned patent application Serial No. 372,623.

The vertical generating motion of work head 312 on column 313 is effected by rotation of a vertical screw 367 which is threaded to the head 312 or to a nut carried thereby. This screw is rotated on the column alternately in opposite directions by pinion 331 through the first one of change gears 332, cradle-rotation-to-vertical-motion ratio change gears 368, bevel gear pair 369, vertical shaft 371, modified motion differential comprising side gears 372 and 373 and planet gear 374, bevel gear pair 375, overhead telescoping shaft 376, and bevel gear pair 377. If the rotation of screw 312 is to be in constant velocity ratio to rotation of the cradle and work spindle the differential 372—374 may be omitted or the spider which supports the planet gear 374 may be locked against motion. But if a varying velocity ratio is desired then there is provided a cam 378 which is driven from shaft 371 through gears 379. The cam acts on a follower roller 381 carried by the differential spider to move the latter and the planet gear about the axis of the side gears 372, 373. Suitable biasing means, not shown, are provided to hold the roller 381 in continuous contact with the cam 378.

Figure 16:
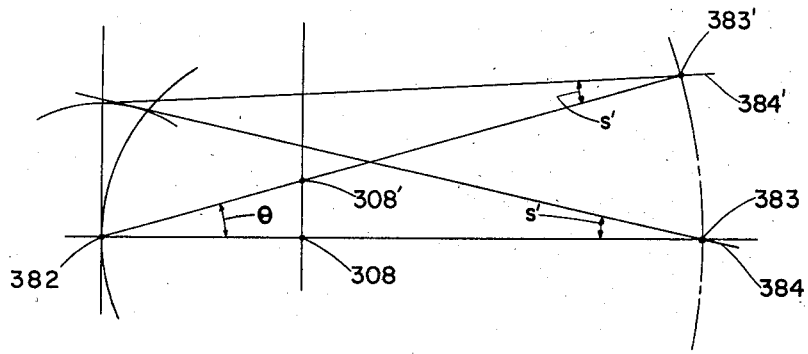
Fig. 16 is a diagram in the pitch plane showing the geometrical relationships involved in generating long-cone-distance straight and skew bevel gears on a machine of the general type shown in Figs. 13, 14 and 15.

For generating spur or helical gears one of gears 334 is removed and the cradle 303 is clamped to the frame, while for generating bevel gears by the conventional method the change gears 368 are removed and the work head 312 is clamped to the column 313. For generating long-cone-distance straight or skew bevel gears, both cradle motion and vertical motion are employed so that gears 334 and also gears 368 are in place and both the cradle and the work head are unclamped. The principle involved in such generation is illustrated in Fig. 16, where point 308 represents the cradle axis (which is perpendicular to the plane of the diagram) and point 382 the axis of the imaginary generating gear. Numeral 383 designates the mean point of the tooth of the generating gear represented by the cutters C'' when at the center of the generating roll, and 383' is a corresponding point when the cutters are above the center of the roll. Point 308' represents the position of the cradle axis 308 when the mean point of the tooth is at 383'. Line 384 represents the direction of the generating gear tooth at the center of the roll, and 384' its direction at point 383'. The angle $s'$ of offset of the line from a radial line through axis 382 remains constant throughout the generating roll. This angle, called the spiral angle or skew angle, is zero in the case of a straight bevel gear. In Fig. 16 it is assumed that the work axis remains stationary, in the horizontal plane of axis 382 and point 383, and that the cradle axis is translated vertically, this being the reverse of the actual operation of the illustrated machine.

The rate of the vertical translation at the center of the generation roll, i. e. when the cradle axis is at 308, in relation to cradle rotation, should be such that the instantaneous center of the motion of the generating tooth (represented by line 384) is at 382. This is achieved by making the translation per radian of cradle rotation:

$$\frac{L}{2\pi} = A'$$

where $A'$ is the distance 382—308.

The theoretical equivalent of rotation of the tooth 384 about axis 382 to any position 384' can be obtained by rotating the cradle about axis 308 (at the same relative rate as the generating gear is to turn about 382) and simultaneously effecting a vertical motion at such rate that:

$$V = A' \tan \theta$$

where V is any distance 308—308' and $\theta$ is the corresponding angle of cradle rotation.

This theoretically correct relationship can be obtained by combining a uniform motion, as effected by a gear drive between the cradle and the vertical slide (such as 368, 369, 375—377 and 367 in Fig. 15) with an additive corrective motion, which may be either exact or approximate, such as the motion which is effected by cam 378 and introduced into the gear drive through the differential means 372—374.

The use of a uniform translation relative to cradle rotation:

$$V = A' \cdot \theta$$

permits a simplified machine construction from which the above-mentioned cam and differential means may be omitted, and at the same time produces gear teeth which are substantially conjugate to mating teeth made by the same method, for in this case the departure in motion from the theoretically exact produces compensating effects on the two members.

It will be further understood that the foregoing description of the invention has been made by way of example and illustration, and not by way of limitation; and that various other changes and modifications may be made in both the machine and the method, without departing from the spirit of our invention or from the scope of the appended claims.

What we claim is:

1. The method of tooth surface generation which comprises rotating a work gear about its axis and in time therewith effecting a relative motion between such axis and the cutting path of a tool, said relative motion being in a trochoidal path in a plane which is inclined to said axis.

2. The method of tooth surface generation which comprises rotating a work gear about its axis and in time therewith effecting a relative motion between said axis and the cutting path of a tool, said relative motion being in a trochoidal path in a plane which is inclined to said axis and which intersects said axis at the cone apex of the gear.

3. The method of tooth surface generation which comprises rotating a work gear about its axis and in time therewith effecting a relative rotation and a relative translation between said axis and the cutting path of a tool, the relative rotation being about an axis inclined to the work gear axis and the relative translation being in a direction which is at a constant angle to said axis of relative rotation and also at a constant angle to the work gear axis.

4. The method of tooth surface generation which comprises rotating a work gear about its axis and in time therewith effecting a relative rotation and a relative translation between the work gear axis and the cutting path of a tool, the relative rotation being about an axis inclined to the work gear axis and the relative translation being in a direction perpendicular to both of said axes.

5. The method of tooth surface generation which comprises rotating a work gear about its axis, and in time therewith rotating the cutting path of a tool about an axis inclined to the work gear axis and effecting a relative translation of said axes in a direction perpendicular to both of them.

6. The method of tooth surface generation which comprises rotating the cutting path of a tool, and in time therewith rotating a work gear about an axis inclined to the axis of rotation of said cutting path and moving the work gear axis rectilinearly in a direction perpendicular to both of said axes.

7. The method of generating a gear on a machine having a frame, a tool support, a spindle carrying the gear, a cradle carrying the tool support and rotatable about an axis inclined to the spindle, a slide movable rectilinearly on the frame in a direction perpendicular to the cradle axis, the cradle being on one of the frame and slide, and the spindle being on the other one thereof and having its axis inclined to the cradle axis, the method comprising rotating the cradle and in time therewith rotating the work spindle and moving the slide.

8. The method of generating a gear on a machine having a frame, a work spindle on the frame for carrying the gear, a slide movable rectilinearly on the frame, a cradle comprising a tool support and rotatable on the slide about an axis perpendicular to the path of the rectilinear slide motion, the spindle axis being inclined to the cradle axis, the method comprising moving the slide on the frame and in time therewith rotating the cradle and the work spindle.

9. Apparatus for generating gears comprising a tool support and a tool mounted thereon for cutting movement, a work spindle, a rotatable cradle on which one of the tool support and the spindle is mounted, means supporting the work spindle with its axis inclined to the cradle axis, means supporting the cradle and the work spindle for relative translation, the last-mentioned means including a slide movable rectilinearly in a path inclined to both the work spindle axis and the cradle axis, and a generating drive train for rotating the cradle and the spindle and in time therewith moving the slide along said path.

10. Apparatus for generating gears comprising a tool support and a tool mounted thereon for cutting motion, a work spindle, means supporting the tool support and the work spindle for relative motion in a trochoidal path in a plane inclined to the spindle axis, and means for rotating said work spindle and in time therewith effecting said relative motion in said trochoidal path.

11. Apparatus for generating gears, comprising a tool support and a tool mounted thereon for cutting motion, a work spindle and a housing in which it is rotatable, means supporting the tool support and said spindle housing for relative rotation about an axis inclined to the axis of rotation of the spindle, said supporting means also supporting the tool support and said spindle housing for relative rectilinear motion in a direction perpendicular to both the spindle axis and the axis of said relative rotation, and a drive connecting the work spindle and said supporting means for simultaneously rotating the work spindle and effecting said relative rotation and said rectilinear motion.

12. A machine for generating gears comprising a frame, a cradle rotatable on the frame, a slide movable on the frame in a path perpendicular to the cradle axis, a tool support having a tool mounted thereon for cutting motion, said support being mounted on one of the cradle and the slide, a work spindle mounted on the other one of the cradle and the slide, and a generating drive train connecting the cradle with the work spindle and the slide for rotating the cradle and the spindle and in time therewith moving the slide on the frame.

13. A machine for generating gears comprising a frame, a slide movable rectilinearly thereon, a cradle rotatable on the slide, a tool support on the cradle having a tool mounted thereon for cutting motion, a work spindle rotatable upon the frame, and a generating drive train for rotating the cradle and the spindle and in time therewith moving the slide on the frame.

14. A machine for cutting gears and the like, comprising a frame, a cradle rotatable on the frame and supporting a tool for cutting motion, a work support having a work spindle rotatable therein, the work support being adjustable on the base to bring either a cylindrical or a tapered work gear on the spindle into cutting relation to the tool, the work support being movable rectilinearly on the base in a direction perpendicular to the axes of the cradle and the work spindle, a generating train and means for driving it alternately in opposite directions, said train being connected to the work spindle, for effecting rotation thereof, and either to the cradle, for effecting rotation thereof in time with rotation of the work spindle for generating tapered gears, or to the work support, for effecting rectilinear motion thereof in time with rotation of the work spindle for generating cylindrical gears.

15. A machine for cutting gears and the like, comprising a frame, a slide movable rectilinearly on the frame, a cutter support and a work support, one of said supports being carried by the slide, one of said supports being a cradle rotatable about an axis perpendicular to the direction of motion of the slide, a work spindle rotatable on the work support, a pair of disc cutters mounted on relatively inclined axes on the cutter support for simultaneous cutting engagement with tooth surfaces of a workpiece on said work spindle, a generating train and means for driving it alternately in opposite directions, said train being connected to the work spindle, for effecting rotation thereof, and either to the cradle, for effecting rotation thereof in time with rotation of the work spindle, or to the slide, for effecting rectilinear motion thereof in time with rotation of the work spindle.

16. A machine for cutting gears and the like, comprising a base, a slide movable rectilinearly on the base, a cutter support and a work support, one of said supports being carried by the slide, one of said supports being a cradle rotatable about an axis perpendicular to the direction of motion of the slide, one of said supports having a tool mounted thereon for cutting motion and the other of said supports having a work spindle rotatable thereon, a generating train and means for driving it alternately in opposite directions, said train being connected to the work spindle, for effecting rotation thereof, and either to the cradle, for effecting rotation thereof in time with rotation of the work spindle, or to the slide, for effecting rectilinear motion thereof in time with rotation of the work spindle, an indexing device in the branch of the generating train connected to the work spindle, and means to operate said device once during each cycle of operation of the generating train to advance the work spindle angularly by an integral number of circular pitches of the work gear.

17. A machine for cutting gears and the like, comprising a base, a cradle rotatable on the base, a pair of cutter spindles, supports for the spindles adjustable on the cradle to position cutters on the spindles to represent tooth surfaces of a spur or a helical rack or of a straight or skew tooth generating gear coaxial with the cradle, a slide rotatably supporting a work spindle, a slide support on which the slide is movable rectilinearly in a path perpendicular to the cradle axis, the slide support being adjustable on the base to bring either a cylindrical work gear or a tapered gear or the like into cutting position, a generating train and means for driving it alternately in opposite directions, said train being connected to the work spindle, for effecting rotation thereof, and means for connecting said train either to the cradle for causing the latter to rotate in time with rotation of the work spindle, or to the slide, for causing the latter to move rectilinearly in time with rotation of the work spindle.

18. A machine for generating gears by the intermittent indexing method, comprising a frame, a tool support and a work spindle support on the frame, a tool mounted for cutting motion on the tool support and a spindle for a work gear rotatable on the work spindle support, one of said supports comprising a rotatable cradle, a slide movable on the frame in a direction perpendicular to the cradle axis, one of said supports being mounted on the slide, and a drive train connecting the slide, cradle and work spindle for effecting translation of the slide and rotation of both the cradle and work spindle in timed relationship, reversing means for effecting alternate forward and return operation of the drive train, and index means operating in time with said reversing means for causing rotative advance of the work spindle to bring successive tooth spaces of the work into position for generation.

19. A machine for generating gears by the hobbing method, comprising a frame, a tool support and a work support, a spindle for a hobbing tool mounted for rotation on the tool support and a spindle for a work gear rotatable on the work support, the tool support comprising a rotatable cradle, a slide movable on the frame in a direction perpendicular to the cradle axis, one of the cradle and the work support being on the slide, and a drive train connecting the slide, cradle, cutter spindle and work spindle for effecting translation of the slide and in time therewith rotations of each of the cradle, cutter spindle and work spindle.

20. A machine for generating gears by the continuous indexing method, comprising a frame, a tool support and a work spindle support, a tool mounted for cutting motion on the tool support and a spindle for a work gear rotatable on the work spindle support, the tool support comprising a rotatable cradle, a slide movable on the frame in a direction perpendicular to the cradle axis, one of the cradle and the work support being mounted on the slide, and a drive train for effecting unidirectional rotation of the work spindle and in time therewith effecting translation of the slide and rotation of the cradle alternately in opposite directions.

21. A machine for generating gears, comprising a frame, a tool support and a work spindle support on the frame, a tool mounted for cutting motion on the tool support and a spindle for a work gear rotatable on the work spindle support, the tool support comprising a rotatable cradle, a slide movable on the frame in a direction perpendicular to the cradle axis, one of the cradle and the work support being mounted on the slide, and a drive train connecting the slide, cradle and work spindle for effecting translation of the slide and rotation of both the cradle and the work spindle in timed relationship.

22. A machine for generating gears comprising a frame having a tool support mounted thereon, a cradle rotatable on the frame, a slide movable rectilinearly on the cradle, and a work spindle on the slide, the axis of the work spindle being inclined to the cradle axis, the slide being movable on the cradle in a direction perpendicular to both the cradle axis and the work spindle axis, and drive means connecting the cradle and the work spindle and the slide for simultaneously rotating the cradle and the work spindle and effecting motion of the slide.

References Cited in the file of this patent
UNITED STATES PATENTS

| | | |
|---|---|---|
| 1,588,560 | Trbojevich | June 15, 1926 |
| 1,680,258 | Schurr | Aug. 7, 1928 |
| 2,444,551 | Bauer | July 6, 1948 |
| 2,634,657 | Aschwanden | Apr. 14, 1953 |
| 2,667,818 | Stewart et al. | Feb. 2, 1954 |